United States Patent [19]

Kousek et al.

[11] Patent Number: 5,296,807
[45] Date of Patent: Mar. 22, 1994

[54] APPARATUS FOR DETERMINING LOCATION OF AN ELEMENT OF MAGNETIZABLE MATERIAL IN A CONSTRUCTION STRUCTURE

[75] Inventors: Heinz Kousek, Feldkirch, Austria; Hansjörg Nipp, Mauren; Otto Noser, Vaduz, both of Liechtenstein; Otmar Ganahl, Blons, Austria; Hans Leemann, Ruggell, Liechtenstein

[73] Assignee: Hilti Aktiengesellschaft, Furstentum, Liechtenstein

[21] Appl. No.: 830,140

[22] Filed: Jan. 31, 1992

[30] Foreign Application Priority Data

Feb. 2, 1991 [DE] Fed. Rep. of Germany ....... 4103216

[51] Int. Cl.⁵ .................. G01R 33/06; G01B 7/14; G01V 3/165
[52] U.S. Cl. ...................................... 324/235; 324/67; 324/207.2; 324/326
[58] Field of Search .................. 324/235, 225, 66, 67, 324/227, 230, 207.2, 207.21

[56] References Cited

U.S. PATENT DOCUMENTS

| | | | |
|---|---|---|---|
| 4,207,519 | 6/1980 | Zatsepin et al. | 324/235 |
| 4,573,013 | 2/1986 | Kusenberger et al. | 324/235 X |
| 4,814,705 | 3/1989 | Saunderson | 324/235 X |
| 4,873,655 | 10/1989 | Kondraske | 324/207.2 X |
| 4,935,698 | 6/1990 | Kawaji et al. | 324/235 X |
| 5,045,920 | 9/1991 | Vig et al. | 324/207.2 X |

FOREIGN PATENT DOCUMENTS

3707419 9/1988 Fed. Rep. of Germany .

Primary Examiner—Gerard R. Strecker
Assistant Examiner—Warren S. Edmonds
Attorney, Agent, or Firm—Anderson Kill Olick & Oshinsky

[57] ABSTRACT

An apparatus for locating magnetizable material (5, 6) within a structure (4) includes a scanning head (1) with a permanent magnet (28) for producing a magnetic field in the structure (4). Two field plates (30, 31), adjacent one another on only one pole face of the permanent magnet (28), are interconnected by a differential circuit and measure the magnetic field of the magnet disturbed by the magnetizable material (5, 6). The differential values measured by the pair of field plates form a differential measured signal for establishing, after differentiation, the location of the magnetizable material (5, 6) within the structure (4). The location of the magnetizable material (5, 6) within the structure can be shown on a monitor (7) of an evaluation unit (3).

14 Claims, 8 Drawing Sheets

APPARATUS FOR DETERMINING LOCATION OF AN ELEMENT OF MAGNETIZABLE MATERIAL IN A CONSTRUCTION STRUCTURE

BACKGROUND OF THE INVENTION

The present invention is directed to an apparatus for locating magnetizable material in a structure and includes a scanning head containing a magnet for producing a magnetic field in the structure with the magnet having a first pole and a second pole. At least two magnetic field sensors are secured in the region of the magnetic poles for measuring the magnetic field disturbed by the magnetizable material. An evaluation unit is connected to the sensors for locating the magnetizable material by signals received from the sensors.

Such apparatus is known from the Andreas Schaab, et al. publication "Die zerstörungsfreie Prüfung der Betondeckung der Bewehrung" (the non-destructive testing of concrete covering reinforcement) in Beton- und Stahlbetonbau (1989), pages 275-279 and 324-327. This known apparatus includes a scanning head or pickup with a permanent magnet for inducing a magnetic field in the structure and two magnetic field sensors fastened to the permanent magnet in the region of its poles for measuring the magnetic field disturbed by the magnetizable material. The permanent magnet is formed as a bar magnet and has one of the magnetic field sensors at each of the two pole regions at opposite ends of the magnet. An evaluation unit locates the magnetizable material by means of the measured signals received from the magnetic field sensors. The permanent magnet is placed with one of its end faces on the structure, such as a concrete member, and its magnetic flux changes as it approaches a reinforcing rod within the concrete member. To be more precise, on approach of the scanning pickup to a reinforcing rod located within the concrete member, the magnetic flux in the magnetic field located between the bar magnet and the structural member increases. This magnetic flux is checked by the sensors and is evaluated by a measurement amplifier and indicates the concrete covering the reinforcing rod.

SUMMARY OF THE INVENTION

Therefore, the primary object of the present invention is to further refine the apparatus mentioned above, so that a more accurate location of the magnetizable material in the structure is possible.

In accordance with the present invention, the magnetic field sensors are field plates connected together by a differential circuit with the field plates positioned adjacent to one another on only one of the poles of the magnet. The apparatus of the invention for locating magnetizable material in a structure is distinguished by the use of the field plates as the magnetic field sensors with the field plates arranged next to one another on only one pole face of the magnet.

The magnet can be a permanent magnet or an electromagnet excited by alternating circuit surges. If a permanent magnet is used a relatively high energy density is achieved, whereby a relatively strong measured signal is obtained. Energy for field generation is not required, which is advantageous with battery powered equipment. The low magnetization of the magnetizable material in the structure is particularly acceptable in this case. In particular, by repeated measurements, such an influence can be eliminated. In the case of an electromagnet, the premagnetization of the magnetizable material is erased with each measurement. A relatively weak primary field is generated with an acceptable expenditure of current, so that the measuring field is relatively small. The measured signals must consequently be further filtered requiring a greater expenditure of technical resources as far as circuitry is concerned.

At the present time, field plates are generally known. The present invention uses magnetically controllable resistors, such as made from InSb/NiSb, whose property of being electrically influenced is based upon the Gauss effect. The charge carriers passing through the semiconductor are deviated sideways by the Lorenz force due to the effect of the magnetic field and this depends upon the magnitude of the magnetic field in a differently pronounced manner resulting in a change of resistance in dependence on the magnetic field.

To locate the position of a magnetizable material, such as a steel reinforcing member in a concrete member, within the structure with the apparatus of the present invention, the scanning head is placed on the surface of the structure so that two field plates are positioned between the face of the permanent magnet and the structure. The magnetic field component oriented perpendicularly to the surface of the structure is measured in several positions over the surface of the structure and in the following description this component is characterized as the vertical magnetic field component. More precisely, each of the two field plates measures a vertical magnetic field component. Since the two field plates are connected together by a differential circuit, one measured value is obtained corresponding to the relative resistance change of both field plates or to the difference of the vertical magnetic field components measured by the plates. This measured value is subsequently called the differential measured value. For instance, it can be obtained by the use of a differential amplifier. Each position of the scanning head on the surface of the structure, where a measurement is performed, is recorded to obtain a correlation between the differential measured value and the measuring position. In addition, the direction of the straight line along which the field plates are located is acquired to fix the direction of the field gradient (change of the vertical magnetic field component) determined by the differential measured value. By combining several differential measured values along a desired track and accounting for the named directions extending in the direction of the track, location dependent differential measured signals can be produced and subsequently differentiated. The zero points of a differential measured signal or the maximum of a differentiated measured signals gives the exact location of the magnetizable material in the structure.

It is also possible to arrange more than two field plates along one straight line with the plates disposed in a series circuit and connected with central taps. The differential measured values of the vertical magnetic field components can be established by two adjacent field plates. Accordingly, the signals generated at the end and central taps of the field plate in series circuit are fed to differential amplifiers.

In a preferred embodiment of the invention, several pairs of field plates are connected to one another by a differential circuit and are arranged on the one pole face of the magnet facing the structure. This arrangement considerably shortens the time period for registering the individual differential values as well as for the generation of the differential measured signals.

According to a preferred embodiment of the invention, the pairs of field plates are arranged along a straight line. The line extending between two field plates of a pair is preferable perpendicular to the mentioned straight line. If the pairs of field plates lying on the straight line are displaced together perpendicularly to the straight line, then for any displacement position of the straight line the differential measured values of the individual pairs of field plates lying on the straight line can be scanned consecutively or simultaneously within a short time span. The differential measured values of one pair of field plates are combined for the different displacement positions of the straight line into a differential measured signal in order to subsequently afford a precise location determination of the magnetizable material in the structure by differentiating the respective differential measured signals. Accordingly, the displacement direction of the straight line lies in the direction of the above mentioned tracks.

Another preferred embodiment of the invention involves arranging pairs of field plates along parallel straight lines in a two dimensional regular pattern or array. Basically in such an arrangement of the field plate pairs, movement would not be necessary, if a sufficient number of the field plate pairs are present. All the connecting lines of two field plates forming a pair could be parallel, however, it is also possible to provide different directions of the connecting lines. For instance, two groups of field plate pairs could be used with the direction of the connecting lines between the two groups arranged one group of pairs extending perpendicular to the other group. Due to the differently oriented pairs of field plates, the structure can be scanned in a corresponding large number of directions, whereby the course of the magnetizable material inside the structure can be determined with greater accuracy.

The pairs of field plates with the connecting line located along the same straight line could be formed as a row of field plates hooked up electrically in series. The number of field plates along such a row can be odd or even. The desired differential measured values can be obtained by switching adjacent field plates together along a row of the pairs.

In another preferred embodiment of the invention, a pole shoe is provided for each field plate. Accordingly, the magnetic field to be measured can be concentrated in the region of the field plate, so that the measurement sensitivity is increased.

In accordance with the invention, the pole shoes of one pair of field plates can be interconnected. The exact positioning of individual pole shoes for the separate field plates is difficult, since the pole shoes and field plates are relatively small. Therefore, two pole shoes of a pair of field plates are manufactured as a single piece, with the connection between the pole shoes produced by a thin plate which bears against the magnet. The thin plate increase the magnet size only slightly, and does not have any disturbing effect.

In an improvement of the invention, the magnet is subdivided along a line extending between two field plates of a pair of plates, with a common field plate substrate connected to the pole shoes associated with the field plate pair. As a result, the magnet has an air gap in the region between the two field plates of the pair. This arrangement increases the flux differences between the two field plates resulting in an even higher sensitivity of the apparatus.

In another desirable embodiment of the invention, the field plates of a pair are connected at their end faces with one vane of a highly permeable material with the vane projecting outwardly from the plates and extending in a straight line running in the direction of the connection of the plates.

On one hand, such vanes afford a further increase in the sensitivity of the apparatus since the vanes also serve as field concentrators. On the other hand, a better positional resolution is afforded by the vanes, since, due to the vanes, the maximum of the measured vertical magnetic field components plates of each pair are further separated. Accordingly, the differential measured signal has a steeper incline in the region of the magnetizable material, whereby the differential signal obtained by differentiation is narrower and higher. As a consequence, the location of the magnetizable material can be determined more simply and accurately.

For performing the measurements with the field plate pairs, the scanning head or pickup can be connected to a travel recorder, so that the position of the scanning head and of the field plate pairs can be accurately determined from a reference position. For instance, if the scanning head is placed upon a structure, then a positional value (reference position) can be adjusted to zero by a suitable circuit arrangement. When the scanning head is moved, the travel recorder affords appropriate positional signals, whereby when registering differential measured values, the measured values can be assigned different fixed positions relative to the reference position. The reference position must of course be identified upon the structure, for instance by an appropriate marking.

Preferably, the pairs of field plates are located on a trolley traveling on wheels with the wheel axles parallel to the straight line of the pairs of plates. With such an arrangement, the structure can be checked in a particularly simple manner for magnetizable material, since the trolley need only be rolled over the surface of the structure. The scanning direction is predetermined by the traveling direction of the trolley. Further, the trolley can be moved several times in different directions across the surface of the structure to be searched, to obtain a more accurate picture of the magnetizable material in the structure. The arrangement of the magnetizable material in the structure can be optically displayed, such as on a monitor.

To move the trolley repeatedly along defined tracks on the structure, the traveling direction of the trolley can be defined by a plate with a traveling channel, which can be placed on the surface of the structure. The plate can be pressed out of a non-magnetic material. Accordingly, the wheels of the trolley run in the traveling channels so that they are guided. In place of a plate, a stamped foil can be used. The starting position of the trolley as well as of each measuring trace is specially marked on the plate or the foil. The traveling channels can be shaped, so that the trolley moved in different directions along the tracks lying parallel to one another.

As mentioned above, the magnet can be a permanent magnet or an electromagnet. If a permanent magnet is used, the field plates can be connected directly or indirectly in the region of one pole face with the permanent magnet. If an electromagnet is employed, an appropriate magnetic core is used, which serves for forming the mentioned pole face. The magnetic core is surrounded by coils and has essentially the same rectangular or oval size or pole face as is present in the permanent magnet. When discussing a subdivision of the magnet, in the case of an electromagnet, the subdivision of the magnetic core is intended.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
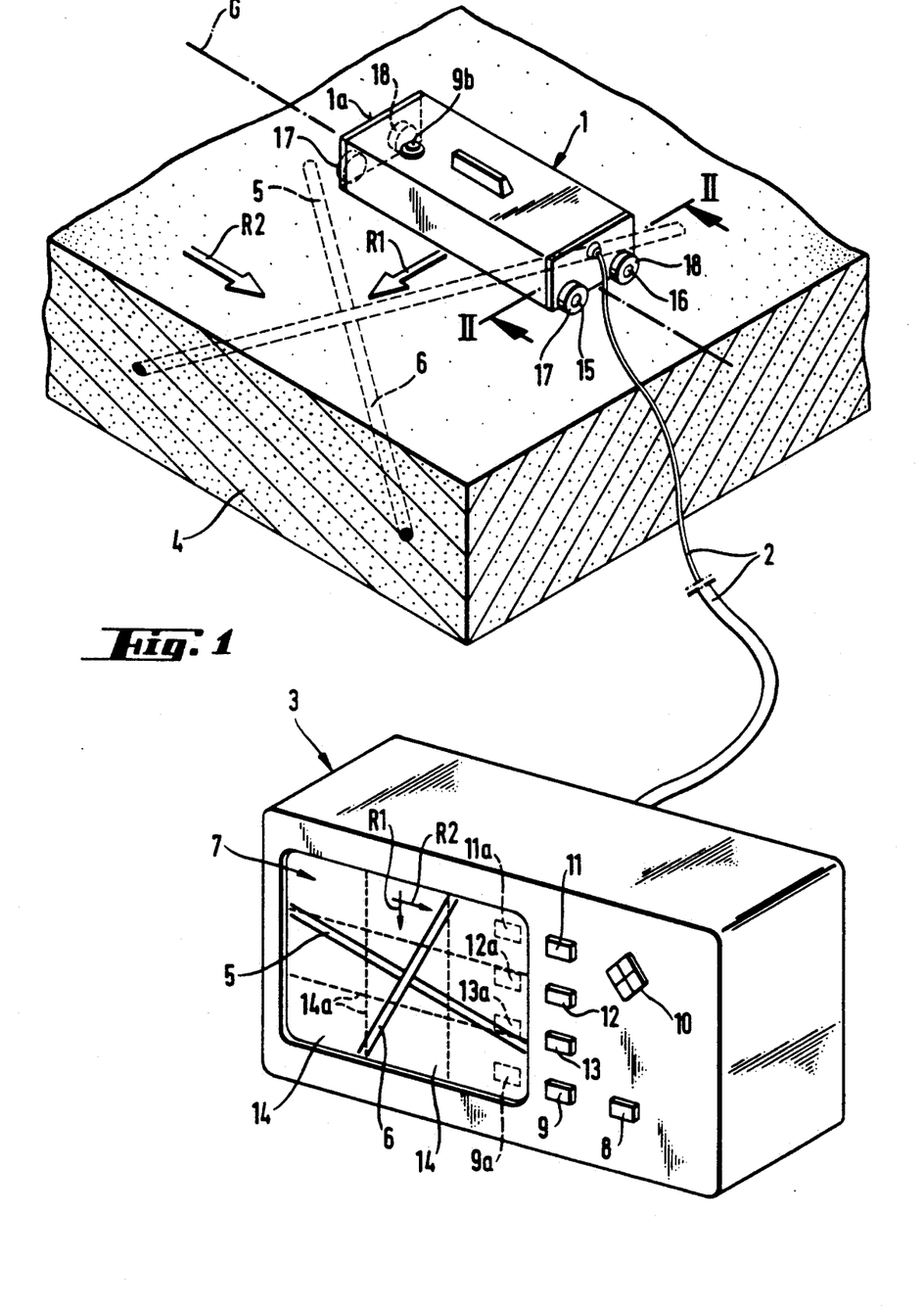
FIG. 1 is a perspective view of the apparatus embodying the present invention showing a scanning trolley and an evaluation unit.

FIG. 1 displays an embodiment of the apparatus incorporating the present invention and used for locating magnetizable material within a structure. The apparatus includes a scanning trolley 1 connected via a cable to an evaluation unit 3. The scanning trolley is located on a surface of a concrete slab 4 containing reinforcing steel in the form two steel reinforcing rods 5, 6, as shown. Evaluation unit 3 includes a monitor 7 on which the reinforcing rods 5, 6, detected by the scanning trolley 1 are displayed. In addition, the unit 3 contains a row of push buttons 11, 12, 13 and 9, located to the right of the monitor 7, for controlling the measuring procedure as well as for actuation of image processing and evaluation functions. The operator command occurs by blending 11a, 12a, 13a and 9a at the edge of the monitor picture tube next to the push buttons for explaining the various functions. This arrangement accommodates national languages as well as supplementing further operational possibilities by means of software, wherein the front plate of the apparatus remains completely visible. A push button 8 enables a leafing forward or backward of an overriding menu. Four push buttons 10 serve for moving a cursor on the picture tube or screen.

The image processing functions permit changing the brightness and the contrast either in the entire picture or in a selectable partial region (zoom-window). The processed partial area can be blended into the original image. Further, filter functions for smoothing out local image disturbances are available. The following are part of the evaluation functions: the display of the coordinates of the cursor position as well as blending in of a system of coordinates, and showing the image of a template of similar scale placed on the structure to guide the scanning trolley. This facilitates the feedback of the location of the magnetizable material within the structure.

The evaluation unit can be connected to other, not shown, units, such as a printer or a computer.

If an image of the reinforcing material existing in a specific region of the concrete slab 4 is to be developed, the region is scanned by the trolley 1. A plate or foil, not shown, provided with travel channels, can be placed on the surface of the concrete slab for guiding the scanning trolley 1. The plate or foil can be placed on or bonded to the surface of the structure. In the following, it is assumed that a square area of the surface of the concrete slab 4 is to be scanned with the length of an edge of the illustrated slab being equal to 3 times the length of the scanning trolley 1. The area of the slab is to be scanned in two directions R1, R2 arranged perpendicularly to one another for obtaining as accurate as possible an image of the reinforcing members. The area being scanned appears on the monitor 7 of the evaluation unit 3 and the area is subdivided into nine partial areas as shown on the monitor by the broken lines. The scanning area is identified by the reference numeral 14, while the broken lines have the reference numeral 14a.

After placing the scanning trolley 1 on the surface of the concrete slab 4, initially a reference position setup button 9b on the trolley is actuated, to set the reference position to the magnitude zero for the positional determination of the measured values obtained by the scanning trolley 1. Next, the scanning trolley 1 is rolled in a first direction R1 across the surface of the concrete slab 4 so that the three partial regions of the scanned area 14 shown on the monitor, each located in a column one below the other, are traversed. Initially, the left hand column is checked and then the process is repeated for the middle and right hand columns of the scanning area 14 with the scanning trolley 1 being repositioned for each region by movement over the surface of the concrete slab 4. After the first scanning operation is completed, the concrete slab is scanned in a perpendicular direction R2 by the trolley 1 so that one after the other the partial regions of the scanning area 14 are traversed. The data obtained by traversing the partial regions by means of the scanning trolley are evaluated, as will be described subsequently, to detect the position of the reinforcing rods 5, 6 within the concrete slab 4 and to generate an appropriate image on the monitor 7. Naturally, the sequence mentioned above must be observed when scanning the desired surface areas of the concrete slab 4, since the evaluation is programmed for the scanning operation. If the program is changed, the scanning area can be subdivided and scanned in a different manner.

The crosswise scanning described above is effective, since only steel rods running transversely of the scanning direction provide the desired measure signals. Steel rods lying obliquely to the scanning direction (up to about 45°) afford a stretched out signal in the scanning direction, wherein the cosine law applies approximately. The signal rise is smaller, whereby on differentiation, a lower signal level is obtained. The missing amount, however, is covered by the scanning process perpendicular to the first direction and is added to it, so that a signal intensity efficient for the evaluation is obtained. Steel rods extending along the scanning direction do not supply a signal changing with time and thus are not detected. Naturally only signal levels for the same scanning positions are added, whereby finally a three-dimensional signal is established in the computer. For this purpose more than two scanning directions can be selected.

To facilitate movement of the scanning trolley 1 over the surface of the concrete slab 4, it is provided with axles 15, 16 arranged parallel to one another with the wheel 17, 18 located on the ends of the axles. Wheel axles 15, 16 are rotationally coupled together, to assure as much as possible straight travel of the scanning trolley 1. The measurement direction is preset by the travel direction of the scanning trolley, which is perpendicular to the axles 15, 16. In FIG. 1, the measurement direction R is defined by the directions R1 and R2.

Figure 2:
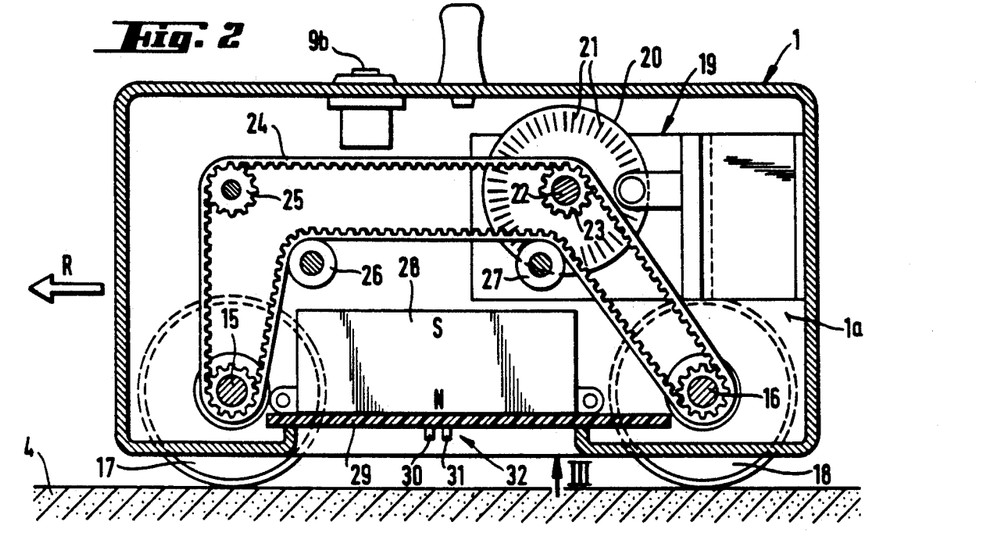
FIG. 2 is a sectional view through the scanning trolley parallel to an end wall and perpendicular to the wheel axles and taken along the line II—II in FIG. 1.

FIG. 2 is a sectional view through the scanning trolley 1 looking toward the inner surface of sidewall 1a, extending perpendicularly to the axles 15, 16. As viewed in FIG. 2, the measurement direction R extends in the horizontal direction.

As can be seen in FIG. 2, a slotted diaphragm recorder 19 is located within the scanning trolley 1 and includes a rotatable slotted diaphragm 20 with slots 21 capable of being scanned by an electro-optical scanning device, not shown. Slotted diaphragm 20 is rotatably supported on an axle 22 fastened to sidewall 1a of the scanning trolley 1. A drive belt 24 runs over a gear like extension 23 on the axle 22, and is guided over reversing rollers 25, 26, 27 as well as extensions on the axles 15, 16. As the scanning trolley 1 travels over the surface of the concrete slab 4, the slotted diaphragm 20 is rotated by the drive belt 24 and the electro-optical device generates a pulsing signal for each unit distance traveled by the scanning trolled as a result of the spacing of the slots 21 in the diaphragm 20. The appropriate pulsing signals are counted so that the exact position of the scanning trolley 1 from the reference point can be determined from the counted sum. The reference position is fixed by actuating the reference position set-up push button 9b, whereby the counted value is a sum established from the zero reference position. The electro-optical device can consist of a light emitting diode and a photosensitive element.

A magnet 28 is located between the wheel axles 15, 16 and is supported on the base of the scanning trolley 1, note FIG. 2, and in this embodiment it is a permanent magnet with its south pole at the upper surface and its north pole at the lower surface. The permanent magnet 28 is rigidly positioned on the scanning trolley 1 and extends for the entire length of the scanning trolley, that is, perpendicular to the plane of the FIG. 2. The length of the permanent magnet 28 is considerably greater than its width or height. As an alternative, the permanent magnet could be replaced by the core of an appropriate electro-magnet. A printed circuit board 29 is located against the lower surface of the permanent magnet 28 and is fastened to the magnet. As viewed in FIG. 2, the circuit board 29 has a pair 32 of field plates mounted on it with the pair consisting of the two field plates 30, 31. The pair 32 of field plates is connected with a microprocessor, not shown in FIG. 2, by electrical line connections, not shown, on the printed circuit board 29. The microprocessor is also located on the printed circuit board 29.

As can be seen in FIG. 2, the field plates 30, 31 of the pair 32 are spaced apart in the scanning direction R. Further, multiple pairs 32 of the field plates, for instance, fourteen field plate pairs are arranged in a straight row on the bottom side of the printed circuit board 29 extending in the longitudinal direction of the scanning trolley 1, that is, in the direction of the axles 15, 16 and parallel to them.

Figure 3:
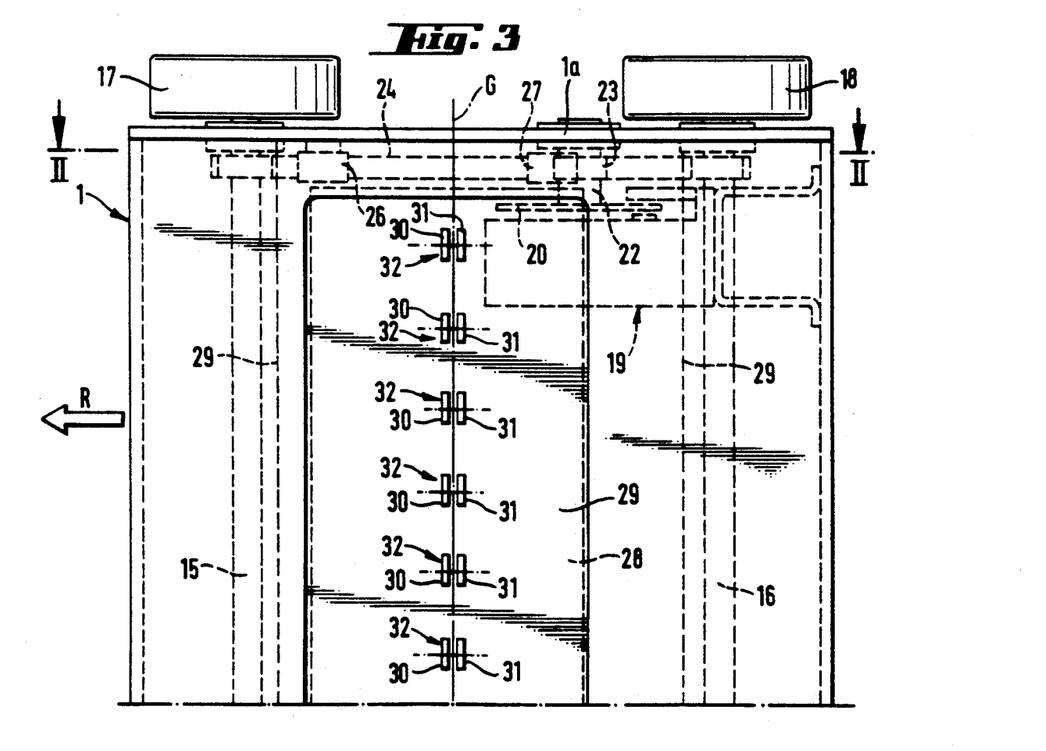
FIG. 3 is a partial bottom view of the scanning trolley with pairs of field plates arranged along a straight line and taken in the direction of the arrow III in FIG. 3.

FIG. 3 shows the arrangement of the pairs 32 of field plates 30, 31 on the bottom side of the printed circuit board 29. In FIG. 3 a bottom view of the lower side of the printed circuit board 29 is illustrated. The scanning or measurement direction is shown by the arrow R extending perpendicularly of the axles 15, 16 in FIG. 2. Accordingly, the measurement direction also represents the direction of movement of the scanning trolley 1. The pairs 32 of field plates are spaced apart from one another by the same amount in the direction extending perpendicularly to the measurement direction R and they lie along a common straight line G. The field plates 30, 31 of a pair 32 are spaced from one another in the measurement direction R or perpendicularly to the straight line G, for measuring the vertical component of the magnetic field of the permanent magnet 28.

As mentioned above, the vertical magnetic field component of the permanent magnet 28 changes as the scanning trolley moves towards the reinforcing rods in the concrete slab 4. The field plates 30, 31 obtain the vertical magnetic field component at two points close to one another identical with the spacing of the field plates. Since the two field plates 30, 31 of a pair 32 are wired in a differential circuit, they directly acquire the differential value between the two vertical magnetic field components and thereby provide a differential measurement value. This differential measurement value corresponds practically to the gradient of the vertical magnetic field component in the direction of the connection of the two field plates of the pair or in the measurement direction R.

Figure 4:
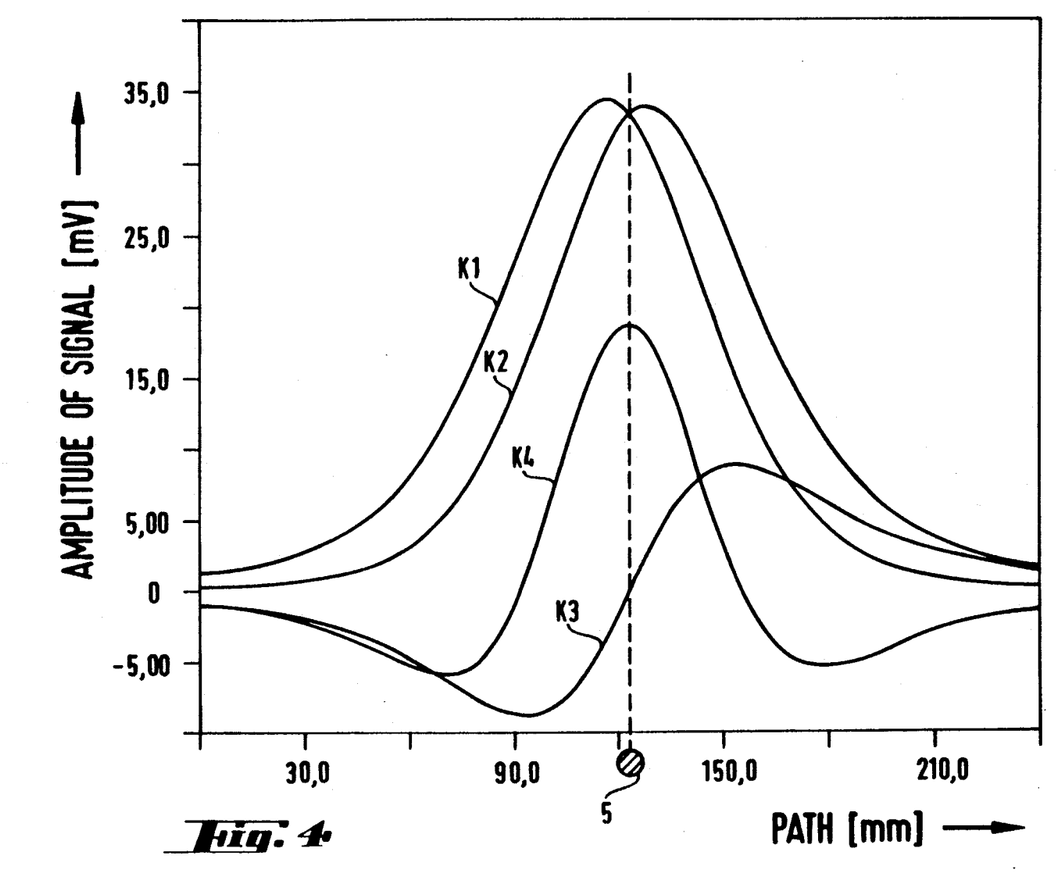
FIG. 4 is a graph of the signal curves obtained by the apparatus shown in FIG. 1 for locating the exact position of magnetizable material, located within a structure.

In FIG. 4 the associated signal curves are shown. The curves K1 and K2 represent the measured values of field plates 30, 31 of a pair 32, while the curve K3 represents the differential measured values of a pair 32 of the field plates. FIG. 4 shows a plot of the signal amplitudes as a function of the travel. The travel is the movement of the scanning trolley 1 in the measurement direction R. The curve K4 displays the differentiated signal course of the differential measuremed signal K3.

More precisely, the differential measured value for all pairs 32 of the field plates is determined and stored for one displacement position of the scanning trolley 1. In a next displacement position of the scanning trolley 1, moved in the measurement direction R, another set of differential measured values is obtained by the pairs 32 of field plates. In this way, the curve K3 is obtained for one differential plate pair 32 as shown in FIG. 4. After the completed displacement of the scanning trolley 1, and the complete registration of the curve K3 in FIG. 4 for each plate pair 32, the curves K3 are differentiated to obtain the differentiated signal curves K4. The maximum of the differentiated signal curves K4 lies at the location of the magnetizable material, as shown in FIG. 4, at the location of a reinforcing rod 5.

Graphs, such as shown in FIG. 4, are formed for each pair 32 of field plates 30, 31 and also for each scanning direction R if the scanning trolley is moved in the different scanning directions R1, R2 over the surface of the concrete slab 4 in FIG. 1. With the help of the established differentiated signal curves K4, it is possible to produce an image of the reinforcing members in the concrete slab 4 in a conventional manner by determining the maximum filtering and the like, whereby the image is then displayed upon the monitor 7 illustrated in FIG. 1.

Figure 5:
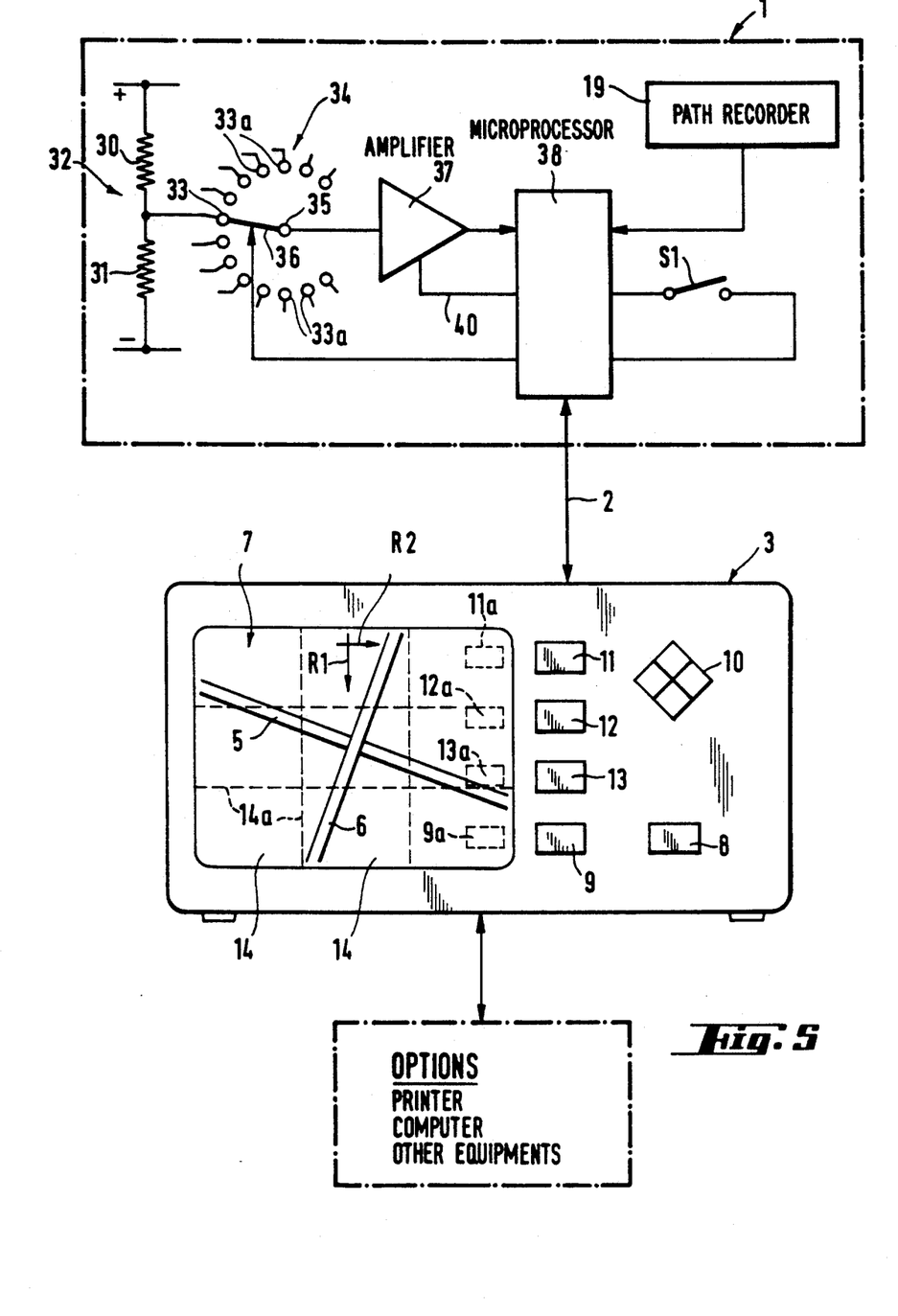
FIG. 5 is a schematic circuit diagram of the apparatus embodying the present invention.

FIG. 5 depicts further details of the electrical makeup of the apparatus embodying the invention. The scanning trolley has fourteen pairs 32 of field plates, 30, 31 wired in series and located between a positive and a negative voltage pole. The central tap between the field plates 30, 31 is fed to a contact 33 of a multiplexer 34. The other contacts 33a of the multiplexer are connected with a central tap of other pairs 32 of field plates. A common contact 35 of the multiplexer is connected with the individual junctions 33, 33a in succession by a changeover switch 36, so that the differential measured values obtained at the central taps of each pair 32 of field plates are fed in succession through an amplifier 37 to a microprocessor 38. The measured values are then stored in the microprocessor for each position of the scanning trolley, for which purpose an appropriate storage and memory region has been provided. The position of the scanning trolley is determined by the above mentioned travel or path recorder 19 (position recorder). The position determined by the recorder 19 and the measured values determined at the position are assigned to one another. After the displacement of the scanning trolley 1 along a path is effected, a corresponding measurement of the differential measured values at a new position is recorded.

All of the measured values obtained in this manner are combined in the differential measured signals shown in FIG. 4 and can be differentiated in the microprocessor 38 of the scanning trolley 1, to obtain the differentiated measured signal curves K4. Alternatively, the measured values can be determined in the evaluation unit 3 and processed for image display.

In addition, it should be noted that the switch contact 36 in FIG. 5 is changed over under control of the microprocessor 38 through the line 39 while a matching or compensation of the amplifier circuit 37 is effected by the microprocessor 38 through a line 40. Switch S1, connected to the microprocessor 38, serves for automatic changeover of the amplification when the measurement area is exceeded.

Figure 6:
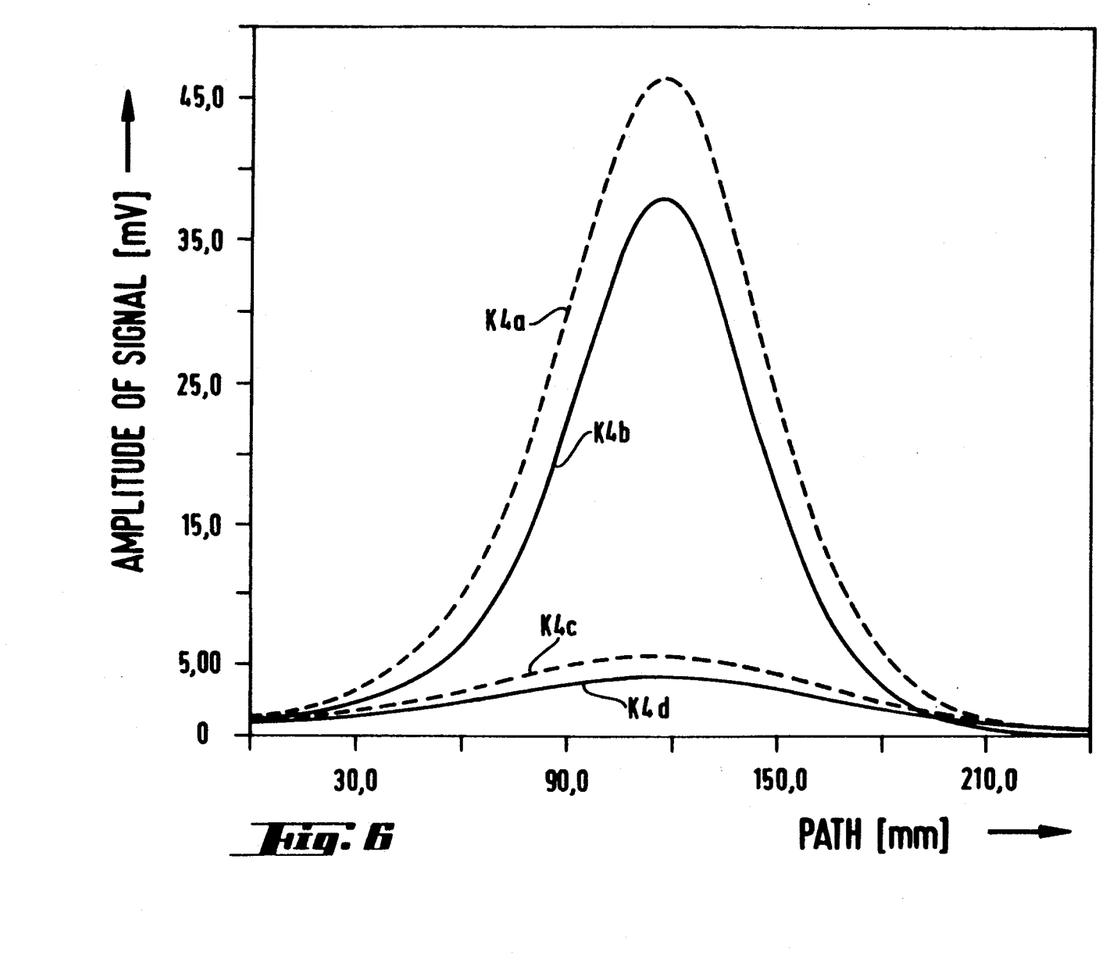
FIG. 6 is another graph showing the signal curves for determining the depth and diameter of the magnetizable material located within the structure.

FIG. 6 shows a graph similar to that in FIG. 4, however, only differentiated signal curves K4a, K4b, K4c and K4d are indicated. Signal curve K4a is for a rod diameter of 22 mm at a depth of 39 mm, signal curve K4b is for a rod diameter of 8 mm at a depth of 36 mm, signal curve K4c is for a rod diameter of 22 mm at a depth of 89 mm, and signal curve K4d is for a rod diameter of 8 mm at a depth of 86 mm. The amplitudes are displayed in mV (millivolts) for the field plate.

It can be noted that the signal amplitude depends greatly on the depth of the reinforcing rod or the thickness of the concrete cover. On the contrary, the signal amplitude is only slightly dependent on the rod diameter. All of the rods in the present case are steel. Curves of similar depth lie relatively close together, even if they represent rods of very different diameter. Curves of different rod depths are spaced very far apart. The width of the curves (increase of the signal upon the approach of the scanning head to the location below which the rod lies, and symmetrically thereto the reduction of the signal afterwards) depends to all intents and purposes not on the diameter of the rod, but on its depth.

Evaluation of the signal curve is effected initially by deciding roughly the depth from the amplitude, and subsequently the rod diameter is determined from the ratio of the width of the curve to the height of the curve. With this information the depth is then corrected. Naturally, comparative curves of known signal courses or curves can be utilized for this purpose and can be compared with the measured signal curves, for making a decision as to the rod diameter and depth.

Figure 7:
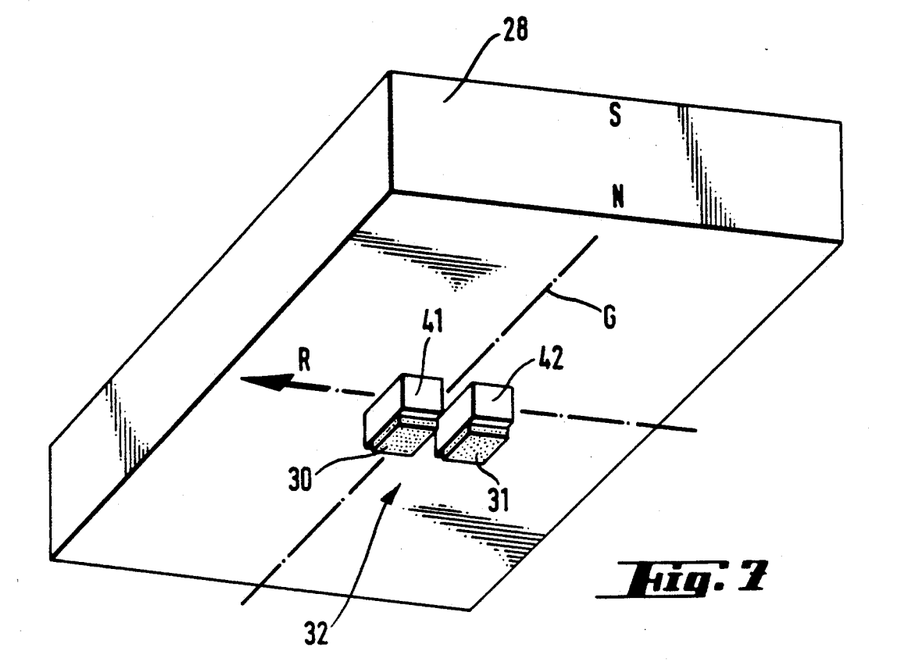
FIG. 7 is a partial bottom view of the scanning trolley in perspective, showing two field plates located on pole shoes.

FIG. 7 is a perspective view of the magnet 28 viewed from below in the region of a pair 32 of field plates 30, 31. Each of the field plates 30, 31 of the pair 32 are located on a pole shoe 41, 42. The pole shoes 41, 42 served to concentrate the magnetic field of the permanent magnet 28 in the area of the field plates 30, 31, so that a higher sensitivity of the inventive apparatus is achieved. The printed circuit board 29 shown in FIG. 2 is not illustrated in FIG. 7 for reasons of clarity and it is located between the field plates 30, 31 and the field shoes 41, 42. It should be noted that each field plate 30, 31 consists of a conductor element with magnetically changeable resistivity and a substrate or carrier on which the resistor or resistivity rests. This arrangement is not set forth in the drawing, to afford simplification.

Furthermore, FIG. 7 shows that the measurement direction R is in the direction of the connection between the two field plates 30, 31 while the long direction of the permanent magnet extends perpendicularly to the measurement direction. The long direction of the magnet is depicted by the dot-dash line G. Additional pairs 32 of field plates extend in the long direction G in FIG. 7, however, the additional pairs have not been shown for sake of clarity.

In another arrangement of the embodiment shown in FIG. 7, the pole shoes 41, 42 are formed of magnetically conductive material and can be connected together to form a single piece, such as by a small web adjacent the surface of the permanent magnet and in contact with the magnet. As a result, the pole shoes 41, 42 do not have to be installed individually, rather they are placed on the permanent magnet 28 as a pair, affording a simpler arrangement, since the pole shoes 41, 42 are relatively small.

Figure 8:
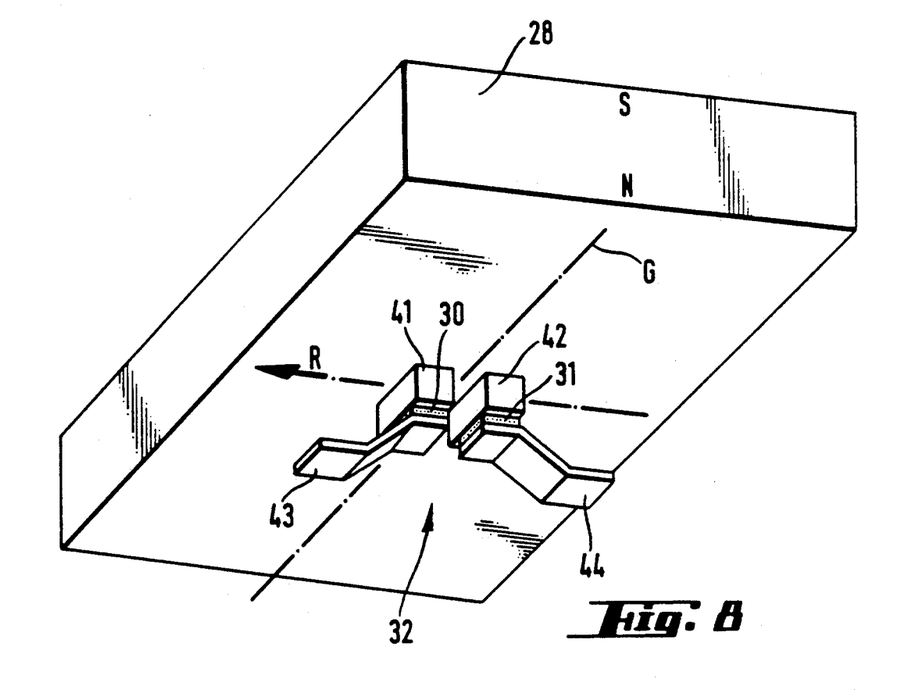
FIG. 8 is a partial bottom view of the scanning trolley shown in perspective illustrating another embodiment of the arrangement shown in FIG. 7 with two field plates mounted on pole shoes and connected to highly permeable vanes.

FIG. 8 displays an additional embodiment of the invention in the region of the pairs 32 of field plates. A vane 43, 44 of a highly permeable material bears directly on each field plate 30, 31. The vanes 43, 44 extend outwardly away from one another projecting outwardly from the individual field plates 30, 31 and extending in or opposite to the measurement direction R.

On one hand, the vanes 43, 44 concentrate the field of the permanent magnet 28 more strongly upon the field plates. With this arrangement an additional sensitivity increase of the apparatus is achieved.

On the other hand, it is possible to pull the maxima of the curves K1, K2 in FIG. 4 further apart by means of the vanes 43, 44, whereby a steeper course of the differential measured signal curve K3 results and with it a narrower or steeper course of the differentiated curve K4, so that a higher resolution capacity during position determination of the magnetizable material is obtained in the structure.

Figure 9:
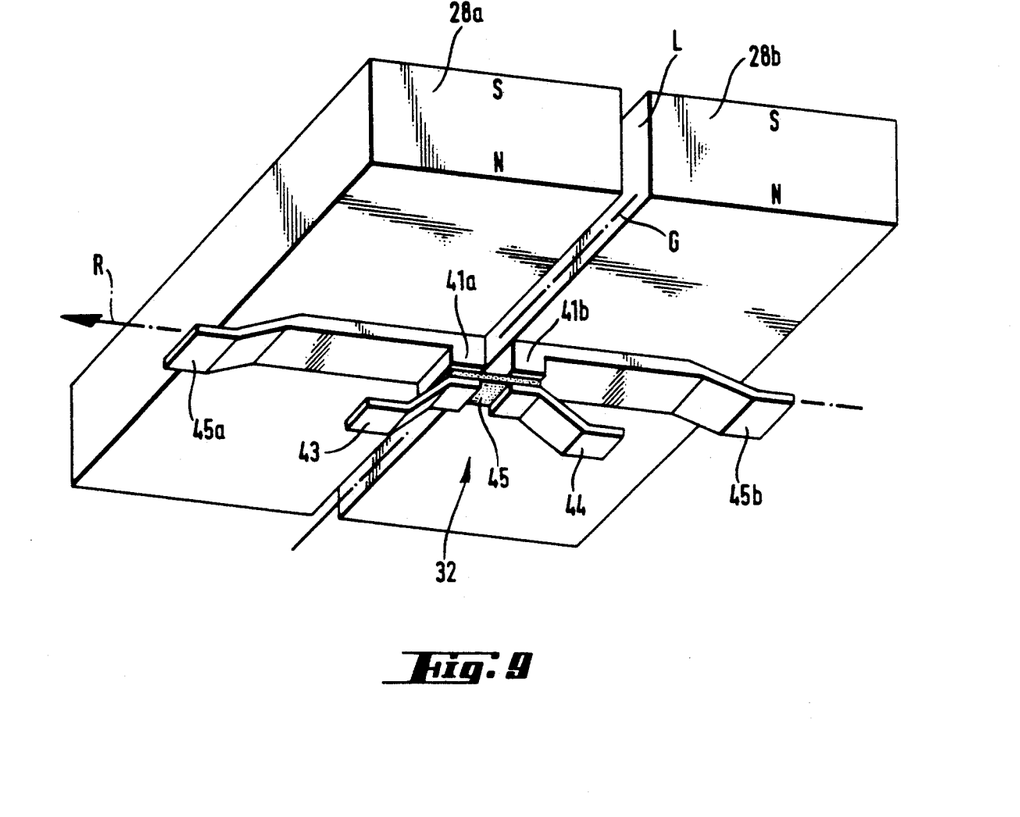
FIG. 9 is a partial bottom view of the scanning trolley shown in perspective and displaying another embodiment with the permanent magnet subdivided in the region between two field plates of a pair.

Yet another embodiment of the invention in the region of the pairs 32 of field plates is shown in FIG. 9. In this embodiment the permanent magnet is subdivided into two permanent magnet halves 22a, 22b with an air gap L between them. At the lower side of the permanent magnets 28a, 28b there is a pole shoe 41a, 41b with a field plate associated with each pole shoe. The field plates are mounted on a common substrate 45 formed of ceramics. The substrate 45 bears against the two pole shoes 41a, 41b. Each field plate has an outwardly extending vane 43, 44 formed of a highly permeable material. The vanes 43, 44 extend in the same manner as in FIG. 8 in or counter to the measurement direction R. The pole shoes 41a, 41b are each connected as a single piece with extensions 45a, 45b and outwardly from the pole shoes are bent outwardly away from the magnets 28a, 28b for affording ease in correcting the feed symmetry. The printed circuit plate 29 is not shown for sake of clarity and is located between the pole shoes 41a, 41b and the substrate 45.

The flux difference between the two field plates can be increased by the arrangement in FIG. 9 for assisting in the improvement of the accuracy of measurement. The pole shoes conduct the magnetic flux from the magnet halves 28a, 28b through the field plates positioned on the common substrate 45 formed of an insulating ceramics and then through the field plates which form additional pole shoes extending away from one another into the outer field.

Figure 10:
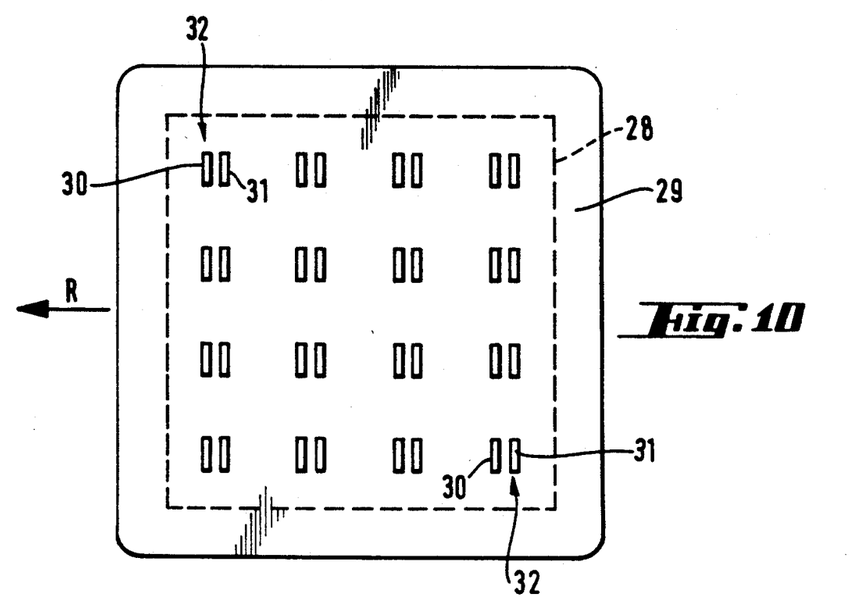
FIG. 10 is a bottom view of a scanning head and/or scanning trolley with field plate pairs arranged in a regular array with the plates oriented in the same direction.

In FIG. 10 a two dimensional arrangement of the pairs 32 of field plates is displayed with the field plate pairs 32 are arranged on one side of the printed circuit board 29 and the permanent magnet 28, formed with a square pole face, located on the other side. A 4×4 array of field plate pairs is shown totalling 16. All of the field plates are oriented in the same direction relative to the measurement direction R and, in addition, they are spaced equally from one another forming a uniform grid. This arrangement has the advantage that the scanning trolley 1 does not have to be displaced as far for establishing the differential measured values. In principle, it is sufficient to effect a displacement covering the spacing of two pairs of field plates in the measurement direction R. For different measurement directions, the scanning trolley 1 must be pivoted. If a great number of pairs of field plates are arranged very close together in the region of the pole face of the permanent magnet 28, then in certain circumstances a displacement of the scanning trolley would be completely unnecessary with this embodiment one could measure in one direction only, so that in such circumstances the entire magnetizable material in the structure could not be detected. An iron wire running parallel to the scanning direction R would not be found.

The pairs of field plates arranged in FIG. 10 transversely to the scanning direction R could be present in the form of a field plate line affording a series circuit of multiple field plates, as shown, eight field plates, with end and middle taps. The measured signals of two adjacent field plates are then selected in pairs. All of the field plates in this arrangement could be spaced the same distance from one another.

Figure 11:
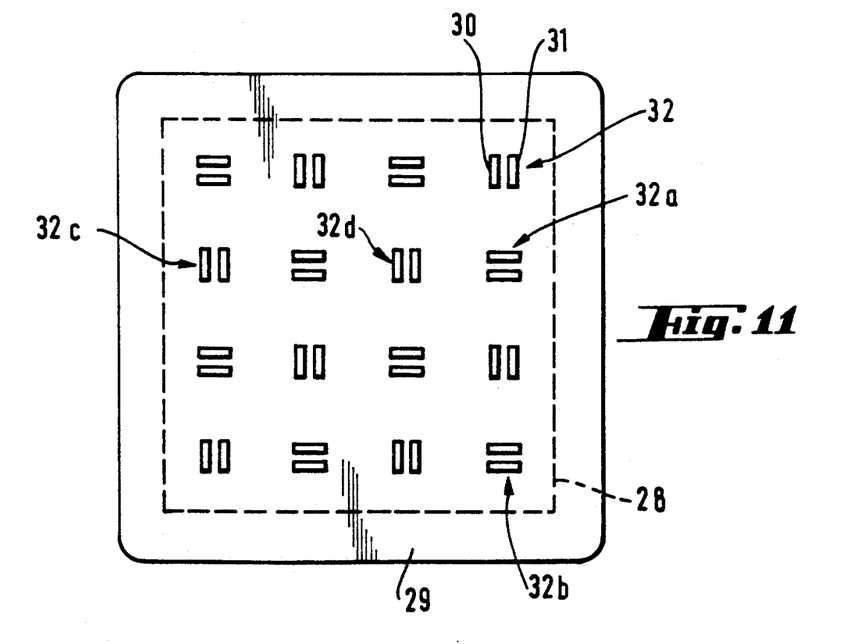
FIG. 11 is a bottom view, similar to FIG. 10, of a scanning head or scanning trolley with pairs of field plates arranged in a regular array, however, with adjacent pairs of plates oriented differently.

A refinement of the arrangement in FIG. 10 is shown in FIG. 11. Again there is a 4×4 array of pairs of field plates totalling 16 pairs forming a uniform two dimensional grid or array. The measurement directions change as viewed in the horizontal direction and in the vertical direction between adjacent pairs of field plates so that in total two measurement directions are afforded. These measurement directions extend perpendicularly to one another. With this arrangement only slight displacement in both measurement directions are required, for registering the existing differential measuremed values for the appropriate displacement position. Displacement of the array of pairs of field plates in this arrangement could be avoided, if a sufficient number of pairs of field plates grouped closely together with the measurement directions changing in the horizontal and vertical directions as viewed in FIG. 11 are present, to obtain sufficiently accurate measured signal curves (curves according to K3 in FIG. 4). Possibly, one could interpolate between two determined measured values in one measuring direction if the pairs of plates are not grouped closely together, in order to obtain calculated intermediate values in completion of the curves K3 in FIG. 4. Different measured values for the measured signal curve in FIG. 4 would then be obtained according to the arrangement in FIG. 11 with the pairs of field plates 32a, 32b or the pair of field plates 32c, 32d. In actual practice, many more pairs of field plates could be used depending on the desired application and the size of the surface of the structure to be scanned.

While specific embodiments of the invention have been shown and described in detail to illustrate the application of the inventive principles, it will be understood that the invention may be embodied otherwise without departing from such principles.

We claim:

1. Apparatus for determining a location of a magnetizable element in a construction structure, said apparatus comprising:

a scanning head displaceable in a scanning direction and including a magnet for producing a magnetic field in the structure and having a bottom pole face adjacent to the surface of the structure along which the scanning head is displaceable;

at least one pair of magnetic field sensors secured in the region of the bottom pole face for measuring the magnetic field disturbed by the magnetizable element, the at least one pair of magnetic field sensors comprising a pair of field plates located on the bottom pole face, the field plates lying, in a spaced relationship relative to each other on a straight line extending parallel to the scanning direction during displacement of the scanning head;

a differential circuit connecting the field plates together for generating a differential measurement value in each scanning position of said scanning head;

means, associated with said differential circuit, for storing generated differential measurement values for all of the scanning positions of the scanning head during displacement of the scanning head along the entire displacement path thereof in the scanning direction; and means, associated with said storing means, for determining a location of the magnetizable element wherein the determining means comprises means for processing the stored differential measurement values for determining a maximum of the stored differential measurement values, which defines the location of the magnetizable element.

2. Apparatus, as set forth in claim 1, wherein the location determining means comprises an evaluation unit.

3. Apparatus, as set forth in claim 1, comprising a plurality of additional pairs of field plates on the bottom pole face and connected to each other in a differential circuit, said storing means storing differential measurement values of all of the pairs of field plates for all of the scanning positions of the scanning head, and the location determining means determining the location of the magnetizable element on the basis of all of the stored differential measurement values of all of the pairs of field plates.

4. Apparatus as set forth in claim 3, wherein the pair (32) of field plates (30, 31) is arranged, in a spaced relationship relative to each other along a straight line (G) extending transverse to the scanning direction (R).

5. Apparatus, as set forth in claim 3, wherein the additional pairs (32) of field plates (30, 31) are arranged in a spaced relationship relative to each other, along straight parallel lines forming a two-dimensional regular array.

6. Apparatus, as set forth in claims 4 or 5, wherein one pole shoe (41, 42; 41a, 41b) is arranged between each field plate (30, 31) and said magnet (28).

7. Apparatus, as set forth in claim 6, wherein the magnet is divided along a line extending between two field plates of one pair and a common field plate substrate (45) bears against the pole shoes (41a, 41b) of the pair of field plates.

8. Apparatus, as set forth in claim 6, wherein the field plates (30, 31) of one pair (32) each have a vane (43, 44) connected thereto with the vane formed of a highly permeable material, and said vanes extend outwardly from the field plate in the direction away from the space between the field plates.

9. Apparatus, as set forth in claim 6, wherein the magnet is a permanent magnet.

10. Apparatus, as set forth in claim 6, wherein the magnet is an electromagnet.

11. Apparatus, as set forth in claim 3, wherein a travel recorder (19) is connected with the scanning head (1) for determining the position of the scanning head.

12. Apparatus, as set forth in claim 11, wherein the pairs (32) of field plates are arranged on a trolley (1) traveling on wheels (17, 18) with the wheels mounted on wheel axles (15, 16) extending parallel to the straight lines of the pairs of field plates.

13. Apparatus, as set forth in claim 12, wherein the two parallel wheel axles (15, 16) are rotationally coupled together with the wheels (17, 18) mounted on the ends of the axles.

14. Apparatus, as set forth in claim 13, wherein the travel recorder (19) includes a slotted diaphragm path recorder with a rotatable slotted diaphragm (20) driven by rotation of at least one of the wheel axles (15, 16).

* * * * *